Nov. 15, 1949  T. W. STEPHENSON ET AL  2,488,481
SPARE TIRE MOUNTING
Filed Feb. 8, 1947  2 Sheets-Sheet 1

T. W. STEPHENSON
C. W. BUGBEE
INVENTORS.
BY
ATTORNEYS.

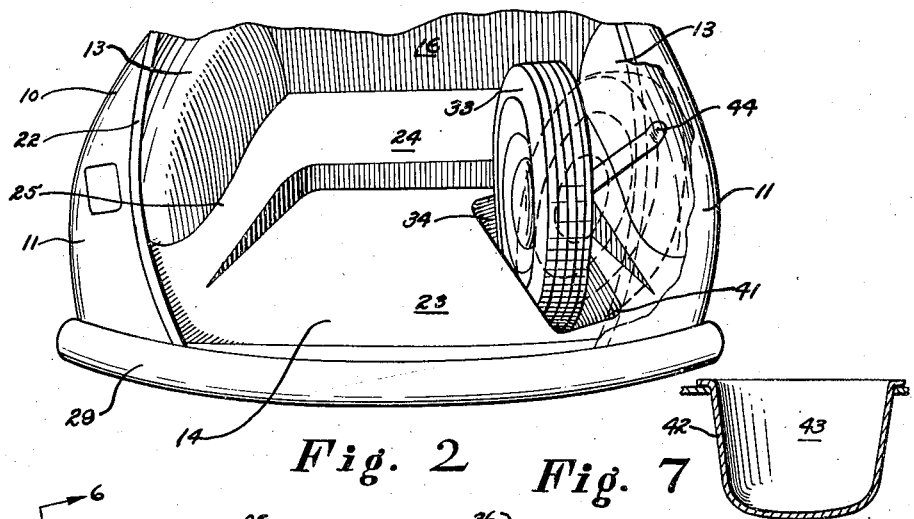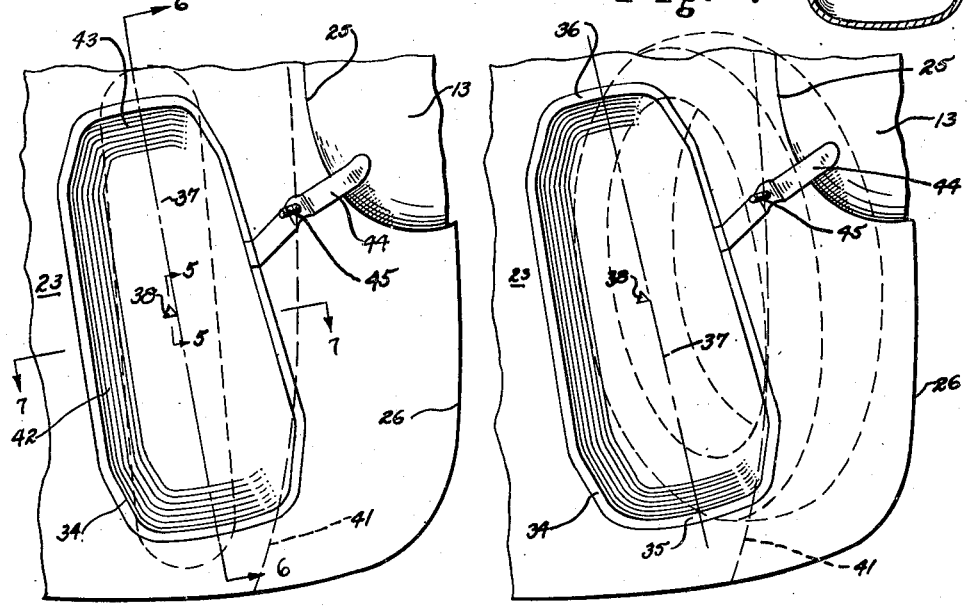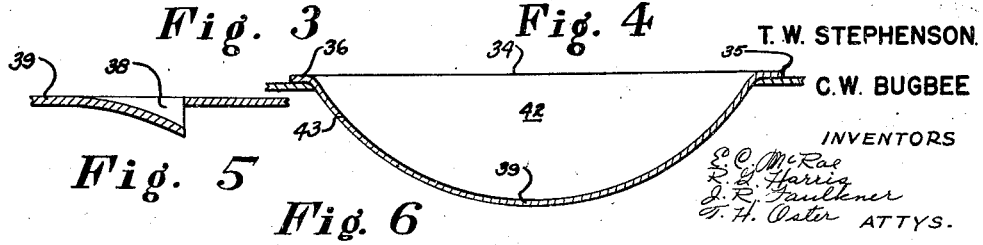

Patented Nov. 15, 1949

2,488,481

UNITED STATES PATENT OFFICE 2,488,481

SPARE TIRE MOUNTING

Thomas W. Stephenson, Detroit, and Charles W. Bugbee, Royal Oak, Mich., assignors to Ford Motor Company, Dearborn, Mich., a corporation of Delaware Application February 8, 1947, Serial No. 727,368

3 Claims. (Cl. 296—37.2)

This invention relates to the structure of the automotive body; and, more particularly, to an improved spare tire mounting to be used within the rear deck compartments of such vehicles.

For a number of years, the spare tire usually carried in motor vehicles has been mounted within the rear deck compartment. A number of mountings have been used in which the tire either lies flat upon the floor or is vertically disposed against a side of the trunk compartment or its front wall. Alternatively, the tire has been mounted directly on the interior of the deck door or special mounting means have been employed by means of which the tire may be swung entirely out of the deck compartment in order to give access to luggage carried there.

Various difficulties have presented themselves in the earlier mountings when the tire is mounted against the forward wall of the deck compartment, it is necessary to remove everything in the compartment before the tire itself can be removed. When the tire is mounted along the side of the compartment, it has been found that it reduces the space considerably and the tire is difficult to place and remove. When a flat mounting is used on the floor, an auxiliary covering member must be supplied so that baggage may be placed above it and a tire so mounted is difficult to secure and also takes up a considerable amount of room, as it is difficult to provide a submerged well in the floor to receive it.

An advantage of the present mounting is that while the tire is mounted along one side of the deck compartment, it is so arranged with respect to the other component of that compartment as to require a minimum of room and the baggage capacity of the deck is not materially reduced. Another advantage of this construction is that the tire is easily placed and removed with a minimum of disarrangement of the baggage stored in the compartment and when in place may be locked securely to prevent rattling, which is always a difficult problem in structures of this type. Still another advantage is that the mounting is economical to make and is particularly adapted to deck compartments in which height is limited, due to the streamlining of the body. The tire, so mounted, may be placed very close to the rear edge of the compartment where it is readily accessible and yet requires a minimum of space and does not demand too deep a well in the floor to accommodate it. Other advantages, both in construction and use of the device, will be made clear from the description of the device set forth in the following specification, claimed in the appended claims and shown in the accompanying drawings, in which:

Figure 2 is a rear view of the deck compartment, the door being removed, showing the tire in position for removal from the compartment in full line and in the stored position in dotted line.

Figure 3 is a plan view of the rear corner of the deck compartment showing the conformation of the tire well, the tire in position for removal being indicated in dotted line.

Figure 4 is a view similar to Figure 3 showing the alignment of the tire when in storage position in the well, the tire then being shown in dotted outline.

Figure 5 is a sectional view on an enlarged scale taken as indicated by the line 5—5 of Figure 3.

Figure 1:
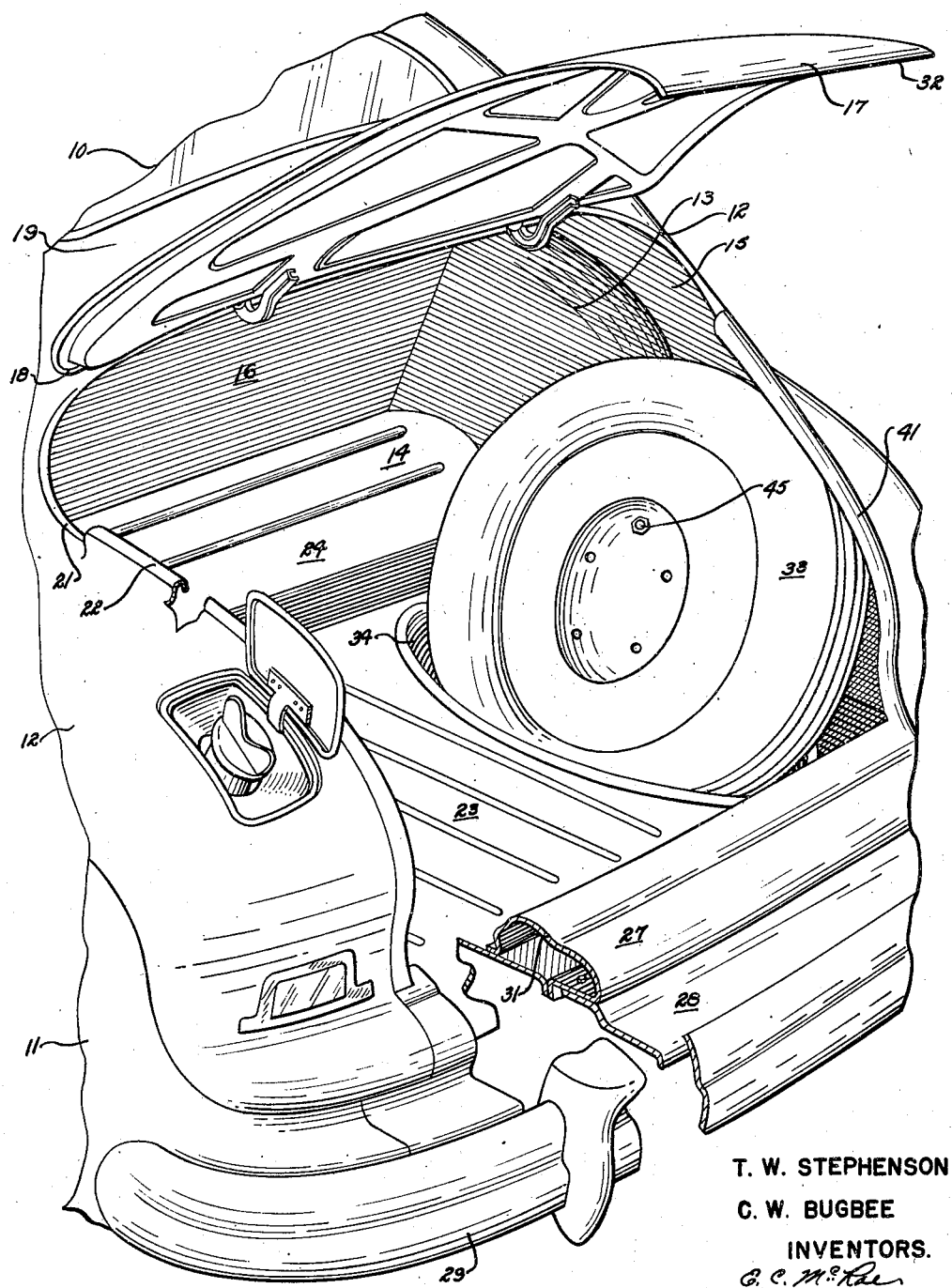
Figure 1 is a perspective view of the rear deck of a motor vehicle showing the deck door open and the spare tire in place according to the teachings of this invention.

Figures 6 and 7 are sectional views taken as indicated by the lines 6—6 and 7—7 of Figure 3.

Referring first to Figure 1, reference character 10 indicates a motor vehicle body having a rear end construction of the type shown generally in copending application, Serial No. 646,053, now Patent No. 2,474,992, dated July 5, 1949, for Rear fender construction, in which the rear fenders are indicated at 11 and the rear quarter panel of the body proper at 12. Contrary to the prevailing practice, the vehicle wheel is not enclosed primarily by the fender 11, but rather by a wheel housing, a portion of which is indicated at 13, this housing being at least partly within the rear deck compartment 14 and spaced inwardly from the vertical wall 15 of the rear quarter panel 12. The rear deck compartment 14 is also bounded by a forward wall 16 and is closed by a door 17 hingedly secured at its upper edge at 18 to the transverse body panel 19.

The edges of the opening to the deck compartment 14 are bounded by a channel 21 around the upper portion of the opening which merges into a ridge 22 along the sides of the opening to collect and direct rain water away from the interior of the compartment. The floor 23 of the compartment is a continuation of the vehicle floor panel and is raised as at 24 to accommodate the rear axle and differential of the vehicle and terminates along its side edges 25 at the wheelhousing 13 and rearwardly of that at 26 against the interior of the vertical wall 15 of the quarter panel. The rear edge of the compartment is completed by a transverse member 27 secured to the floor panel 23 and extending between the opposite quarter panels 12. A stone guard 28 is attached to the transverse member 27 and substantially fills the distance between the latter and the bumper 29 to prevent stones from being thrown and marring the finish of the rear of the vehicle. The transverse member 27 is formed with a ridge 31 against which the lower edge 32 of the door 17 abuts to prevent leakage of moisture to the interior of the truck.

The spare tire is indicated at 33 and is partially received within a well 34 set in the floor 23 at one side of and adjacent the rear of the deck compartment. The outline of this well is important to the proper working of this invention and is shown in some detail in Figures 3 and 4. There it will be seen that rather than being rectangular in plan, the forward end 35 is smaller than the rearward end 36 of the well and the longitudinal axis of symmetry of the well, indicated by the dotted line 37, is slightly oblique to the longitudinal axis of the vehicle extending, as it does, forwardly and inwardly with respect to the latter. A small bleed 38 is provided in the bottom 39 of the well to permit moisture accumulating in the well to drain out, but is directed rearwardly so that material thrown up by the wheels will not be forced to the interior of the well.

The reason for the conformation and arrangement of the well will best be understood by referring to Figures 2, 3, and 4. As shown in Figure 3, the tire 33—when being placed in the storage position—is rolled forwardly on the floor 23 just clearing the side and rear edge 41 of the quarter panel which is shown in these figures in dashed line. As the tire rolls forwardly, it is received in the well 34 in substantially the position shown in dotted line, in Figure 3. When it is centered in the well in that position, it is released and pushed slightly toward the right—the sloping conformation of the side and end walls 42 and 43 of the well 34 being such as to guide the tire to the position shown in Figure 4 in which it will rest against the strut 44 provided to receive it and in proper alignment therewith so that a stud 45 on the strut 44 may be engaged with one of the holes in the wheel hub in the usual manner. It will then be noted from Figures 2 and 4 that the tire occupies a position beneath the overhanging portion of the quarter panel immediately within the deck compartment and that the space taken by it is at a minimum. Moreover, the longitudinal axis of the tire is shifted so as to be more oblique to the longitudinal axis of the vehicle than was the case when it was admitted to the well. This will be clear by comparison of the dotted line representations of the tire in the two positions. When it is desired to remove the tire it need only be erected, in which case it will swing within the well to the position shown in Figure 3 from whence it may be easily withdrawn without interference with the overhanging body portion.

The advantage of this construction is believed to be clear. By employing a well on the conformation shown, slightly oblique to the general longitudinal axis of the car, and of increasing width from the front to the back, it is possible to direct the tire easily and roll it into position. Once the tire is in the well, it need merely be pushed slightly to one side in which case the conformation of the walls of the well bring it into proper relationship with the body and insure that it will be in such a position that it may be readily secured to the holding means generally provided. The lower part of the tire then rests against the bottom 39 and the inner side wall 42 of the well and its upper part against the inner surface of the wheelhousing 13 and is drawn tightly against them by a nut turned up on the stud 45 effectively preventing rattle.

It is, of course, well-known that wheel wells have been provided for many years in the rear deck of motor vehicles. However, the invention here is deemed to reside in the particular shape of the wheel well and its arrangement within the rear deck of the vehicle in that it co-operates with the overhang of the body and the wheelhousing within the deck compartment to provide a storage space for the tire from which it may be removed or replaced readily and without disarrangement of the other contents of the compartment and in which it may be fastened in a proper and secure position at all times.

It is realized that certain changes may be made in the specific construction here shown and it is the intention to cover by the following claims such of these changes as are within the reasonable scope of this invention.

The invention claimed is:

1. In an automobile body rear deck construction having a floor panel and a side panel extending along one side of said floor panel and around the rear corner and a part of the rear edge of said floor panel, said side panel merging into an inwardly extending deck panel overlying and spaced a substantial distance above said floor and having a generally longitudinally extending inner edge defining the side of an opening to said compartment, a tire well sunk into said floor panel and characterized by being positioned adjacent the rear corner thereof and located substantially entirely between the longitudinal center plane of the body and the vertical plane through the longitudinal inner edge of said overlying deck panel, said tire well having a longitudinal axis forming an acute angle with the longitudinal center plane of the body and extending forwardly and inwardly with respect thereto, and a supporting member for the tire positioned beneath said overlying deck panel and arranged to support the tire in a plane inclined from the vertical with the upper portion of the tire concealed beneath the overlying deck panel.

2. In an automobile body rear deck construction having a floor panel and a side panel extending along one side of said floor panel and merging into an inwardly extending deck panel overlying and spaced a substantial distance above said floor panel and having a generally longitudinally extending inner edge defining the side of an opening to the rear deck compartment, a tire well sunk into said floor panel and characterized by being positioned adjacent the rear corner thereof and having a longitudinal axis inclined with respect to the longitudinal center plane of the body and extending forwardly and inwardly with respect thereto, said tire well being wider at its rearward than at its forward end and having forwardly converging sides, said tire well being adapted to receive a tire rolled vertically past the inner edge of said overlying deck panel and to seat the tire in said well in a position such that its longitudinal axis forms a greater angle with the longitudinal center plane of the body than does the longitudinal axis of said tire well so that said tire may be partially concealed by the overlying deck panel.

3. The structure defined by claim 2 which is further characterized in that a portion of said tire well is disposed beneath said overlying deck panel.

and a supporting strut is provided between said floor panel and said side panel, said supporting strut being inclined laterally outwardly and arranged to support the tire in a position inclined with respect to a vertical axis with the upper portion of the tire concealed beneath said overlying deck panel.

THOMAS W. STEPHENSON.
CHARLES W. BUGBEE.

REFERENCES CITED

The following references are of record in the file of this patent:

UNITED STATES PATENTS

| Number | Name | Date |
| --- | --- | --- |
| 2,063,598 | Franklin | Dec. 8, 1936 |
| 2,101,748 | Michel et al. | Dec. 7, 1937 |
| 2,246,861 | Slack | June 24, 1941 |

FOREIGN PATENTS

| Number | Country | Date |
| --- | --- | --- |
| 629,724 | France | Aug. 2, 1927 |